(12) United States Patent
Narayanan et al.

(10) Patent No.: US 10,891,949 B2
(45) Date of Patent: Jan. 12, 2021

(54) VEHICLE LANGUAGE PROCESSING

(71) Applicant: Ford Global Technologies, LLC, Dearborn, MI (US)

(72) Inventors: Praveen Narayanan, San Jose, CA (US); Lisa Scaria, Milpitas, CA (US); Ryan Burke, Palo Alto, CA (US); Francois Charette, Tracy, CA (US); Punarjay Chakravarty, Mountain View, CA (US); Kaushik Balakrishnan, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 214 days.

(21) Appl. No.: 16/125,944

(22) Filed: Sep. 10, 2018

(65) Prior Publication Data
US 2020/0082817 A1    Mar. 12, 2020

(51) Int. Cl.
*G10L 21/00*    (2013.01)
*G10L 15/22*    (2006.01)
(Continued)

(52) U.S. Cl.
CPC .............. *G10L 15/22* (2013.01); *B60W 10/04* (2013.01); *B60W 10/18* (2013.01); *B60W 10/20* (2013.01);
(Continued)

(58) Field of Classification Search
CPC ......... G10L 15/22; G10L 15/16; G10L 25/21; G10L 15/30; G10L 2015/223;
(Continued)

(56) References Cited

U.S. PATENT DOCUMENTS 7,183,944 B2 *  2/2007  Gutta .................. G08G 1/0965
                                                340/937
8,838,446 B2 *  9/2014  Jeong ..................... G10L 15/02
                                                704/202
(Continued)

FOREIGN PATENT DOCUMENTS

AU       2017101166 A4    11/2017
CN        106847294 A      6/2017
(Continued)

OTHER PUBLICATIONS

Yuan et al., "Auxiliary Loss Multimodal GRU Model in Audio-Visual Speech Recognition", Special Section on Recent Advantages of Computer Vision Based on Chinese Conference on Computer Vision (CCCV) 2017, IEEE Access, vol. 6, 2018.
(Continued)

*Primary Examiner* — Akwasi M Sarpong
(74) *Attorney, Agent, or Firm* — Brandon Hicks; Bejin Bieneman PLC (57) ABSTRACT

A computing system can be programmed to receive a spoken language command in response to emitting a spoken language cue and process the spoken language command with a generalized adversarial neural network (GAN) to determine a vehicle command. The computing system can be further programmed to operate a vehicle based on the vehicle command.

20 Claims, 6 Drawing Sheets

(51) Int. Cl.
| | | |
|---|---|---|
| *G10L 15/16* | (2006.01) | |
| *G10L 25/21* | (2013.01) | |
| *G10L 15/30* | (2013.01) | |
| *G06N 3/04* | (2006.01) | |
| *G06N 3/08* | (2006.01) | |
| *B60W 10/04* | (2006.01) | |
| *B60W 10/20* | (2006.01) | |
| *B60W 10/18* | (2012.01) | |
| *B60W 50/10* | (2012.01) | |
| *B60W 50/00* | (2006.01) | |

(52) U.S. Cl.
CPC ............ *B60W 50/10* (2013.01); *G06N 3/04* (2013.01); *G06N 3/08* (2013.01); *G10L 15/16* (2013.01); *G10L 15/30* (2013.01); *G10L 25/21* (2013.01); *B60W 2050/007* (2013.01); *B60W 2540/21* (2020.02); *G10L 2015/223* (2013.01)

(58) Field of Classification Search
CPC ... G10L 15/063; G10L 2015/088; G06N 3/04; G06N 3/08; B60W 10/04; B60W 10/20; B60W 10/18; B60W 50/10; B60W 2540/21; B60W 2050/007
USPC .................................. 704/232, 275; 382/155
See application file for complete search history.

(56) References Cited

U.S. PATENT DOCUMENTS

| | | | | |
|---|---|---|---|---|
| 9,434,314 | B2* | 9/2016 | DeLine | B60R 11/0217 |
| 9,466,292 | B1* | 10/2016 | Lei | G10L 15/16 |
| 10,338,594 | B2* | 7/2019 | Long | G06K 9/00805 |
| 10,369,974 | B2* | 8/2019 | Carlson | B60L 53/60 |
| 10,475,465 | B2* | 11/2019 | Peleg | G06K 9/4628 |
| 10,650,306 | B1* | 5/2020 | Kumar | G06N 3/0454 |
| 10,665,222 | B2* | 5/2020 | Bang | G10L 15/02 |
| 2007/0288242 | A1* | 12/2007 | Spengler | G10L 15/20 |
| | | | | 704/275 |
| 2012/0239224 | A1* | 9/2012 | McCabe | G05D 1/0297 |
| | | | | 701/2 |
| 2012/0239238 | A1* | 9/2012 | Harvey | B66F 9/063 |
| | | | | 701/25 |
| 2014/0119567 | A1* | 5/2014 | DeLine | G07F 7/1008 |
| | | | | 381/86 |
| 2016/0104479 | A1* | 4/2016 | Bloomer | G10L 15/01 |
| | | | | 704/254 |
| 2016/0288796 | A1* | 10/2016 | Yuan | B60K 35/00 |
| 2017/0125038 | A1* | 5/2017 | Hassani | G10L 15/063 |
| 2017/0140777 | A1* | 5/2017 | Amman | G10L 15/01 |
| 2017/0313196 | A1* | 11/2017 | Ratadiya | H02J 1/00 |
| 2017/0341583 | A1* | 11/2017 | Zhang | B60R 1/003 |
| 2018/0032902 | A1* | 2/2018 | Krishnan | G06N 20/00 |
| 2018/0233145 | A1* | 8/2018 | Bathiche | G01S 13/726 |
| 2018/0321685 | A1* | 11/2018 | Yalla | G05D 1/0274 |
| 2018/0342258 | A1* | 11/2018 | Huffman | G10L 15/02 |
| 2019/0043506 | A1* | 2/2019 | Rivkin | G10L 15/32 |
| 2019/0103092 | A1* | 4/2019 | Rusak | G06N 20/00 |
| 2019/0147320 | A1* | 5/2019 | Mattyus | G06K 9/6259 |
| | | | | 382/155 |

FOREIGN PATENT DOCUMENTS

| | | |
|---|---|---|
| CN | 107293289 A | 10/2017 |
| JP | 201836413 A | 3/2018 |

OTHER PUBLICATIONS

Goodfellow et al., "Generative Adversarial Nets", arXiv:1406.2661v1, Jun. 10, 2014.

Hsu et al., "Learning Latent Representations for Speech Generation and Transformation", arXiv:1704.04222V2, Sep. 22, 2017.

Larsen et al., "Autoencoding beyond pixels using a learned similarity metric", arXiv:1512.09300v2, Feb. 10, 2016.

Lee et al., "Fully Character-Level Neural Machine Translation without Explicit Segmentation", arXiv:1610.03017v3, Jun. 13, 2017.

Radford et al., "Unsupervised Representation Learning With Deep Convolutional Generative Adversarial Networks", arXiv:1511.06434v2, Jan. 7, 2016.

Juvela et al., "Speech waveform synthesis from MFCC sequences with generative adversarial networks", Proceedings of the 2018 IEEE International Conference on Acoustics, Speech, and Signal Processing, Apr. 16-20, 2018, Calgary, Canada (arXiv:1804.00920v1, Apr. 3, 2018).

Gao et al., "Voice Impersonation Using Generative Adversarial Networks", arXiv:1802.06840v1, Feb. 19, 2018.

Wang et al., "Tacotron: Towards End-to-End Speech Synthesis", arXiv:1703.10135v2, Apr. 2017.

\* cited by examiner

VEHICLE LANGUAGE PROCESSING

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine trajectories to be used to operate a vehicle in autonomous or semi-autonomous mode, for example, wherein the computing device can provide information to controllers to operate vehicle on a roadway in traffic including other vehicles. Based on sensor data, a computing device can determine a path polynomial for a vehicle to travel to reach a destination on a roadway in the presence of other vehicles and pedestrians, where a path polynomial is a polynomial function that describes a line connecting successive trajectories of a vehicle as it moves from a first location on a roadway to a second location on a roadway. A path polynomial can be determined to keep the vehicle within the roadway and avoid collisions with objects including other vehicles and pedestrians, for example. A computing device in a vehicle can be programmed to emit audio cues regarding operation of the vehicle in the form of spoken language. The computing device can receive responses to the audio cues in the form of spoken language and process the spoken language to determine a path polynomial for operating the vehicle.

Disclosed herein is a method, including receiving a spoken language command in response to emitting a spoken language cue, processing the spoken language command with a generalized adversarial neural network (GAN) to determine a vehicle command, and operating a vehicle based on the vehicle command. The spoken language command can be transformed into mel frequency samples before processing with the GAN. The mel frequency samples can be each compressed into a single vector by convolving mel values along a y-axis before processing with the GAN. A mel frequency scale is a log power spectrum of spoken language command frequencies on a nonlinear scale of frequencies. A first step in processing the mel frequency samples with a GAN can be performing a 1D convolution in the X-direction to reduce the number of mel frequency samples to a number greater than one. A second step in processing the mel frequency samples with a GAN is performing a 1D convolution in the Y-direction. A third step in processing the mel frequency samples with a GAN is processing the mel frequency samples with a neural network.

The GAN can be trained determine real or fake spoken language using a plurality of recorded spoken language commands, ground truth that identifies the recorded spoken language commands as real or fake and a loss function based on ground truth. The loss function can be calculated by summing a loss function based on output from a discriminator portion of the GAN with a loss function based on ground truth. Operating the vehicle can include determining a path polynomial based on the vehicle command. Operating the vehicle can include determining a cognitive map based on vehicle sensor data. Operating the vehicle can include determining a destination location on the cognitive map and determining a path polynomial that will permit the vehicle to reach the destination location. Synthetic language data can be processed with a GAN to determine the spoken language cue. The vehicle command can be a request for goal-directed behavior of the vehicle.

Further disclosed is a computer readable medium, storing program instructions for executing some or all of the above method steps. Further disclosed is a computer programmed for executing some or all of the above method steps, including a computer apparatus, programmed to receive a spoken language command in response to emitting a spoken language cue, process the spoken language command with a generalized adversarial neural network (GAN) to determine a vehicle command, and operate a vehicle based on the vehicle command. The spoken language command can be transformed into mel frequency samples before processing with the GAN. The mel frequency samples can be each compressed into a single vector by summing mel values along a y-axis before processing with the GAN. A mel frequency scale is a log power spectrum of spoken language command frequencies on a nonlinear scale of frequencies. A first step in processing the mel frequency samples with a GAN can be performing a 1D convolution in the X-direction to reduce the number of mel frequency samples to a number greater than one. A second step in processing the mel frequency samples with a GAN is performing a 1D convolution in the Y-direction. A third step in processing the mel frequency samples with a GAN is processing the mel frequency samples with a neural network.

The computer apparatus can be further programmed to train the GAN to determine real or fake spoken language using a plurality of recorded spoken language commands, ground truth that identifies the recorded spoken language commands as real or fake and a loss function based on ground truth. The loss function can be calculated by summing a loss function based on output from a discriminator portion of the GAN with a loss function based on ground truth. Operating the vehicle can include determining a path polynomial based on the vehicle command. Operating the vehicle can include determining a cognitive map based on vehicle sensor data. Operating the vehicle can include determining a destination location on the cognitive map and determining a path polynomial that will permit the vehicle to reach the destination location. Synthetic language data can be processed with a GAN to determine the spoken language cue. The vehicle command can be a request for goal-directed behavior of the vehicle.

Figure 1:
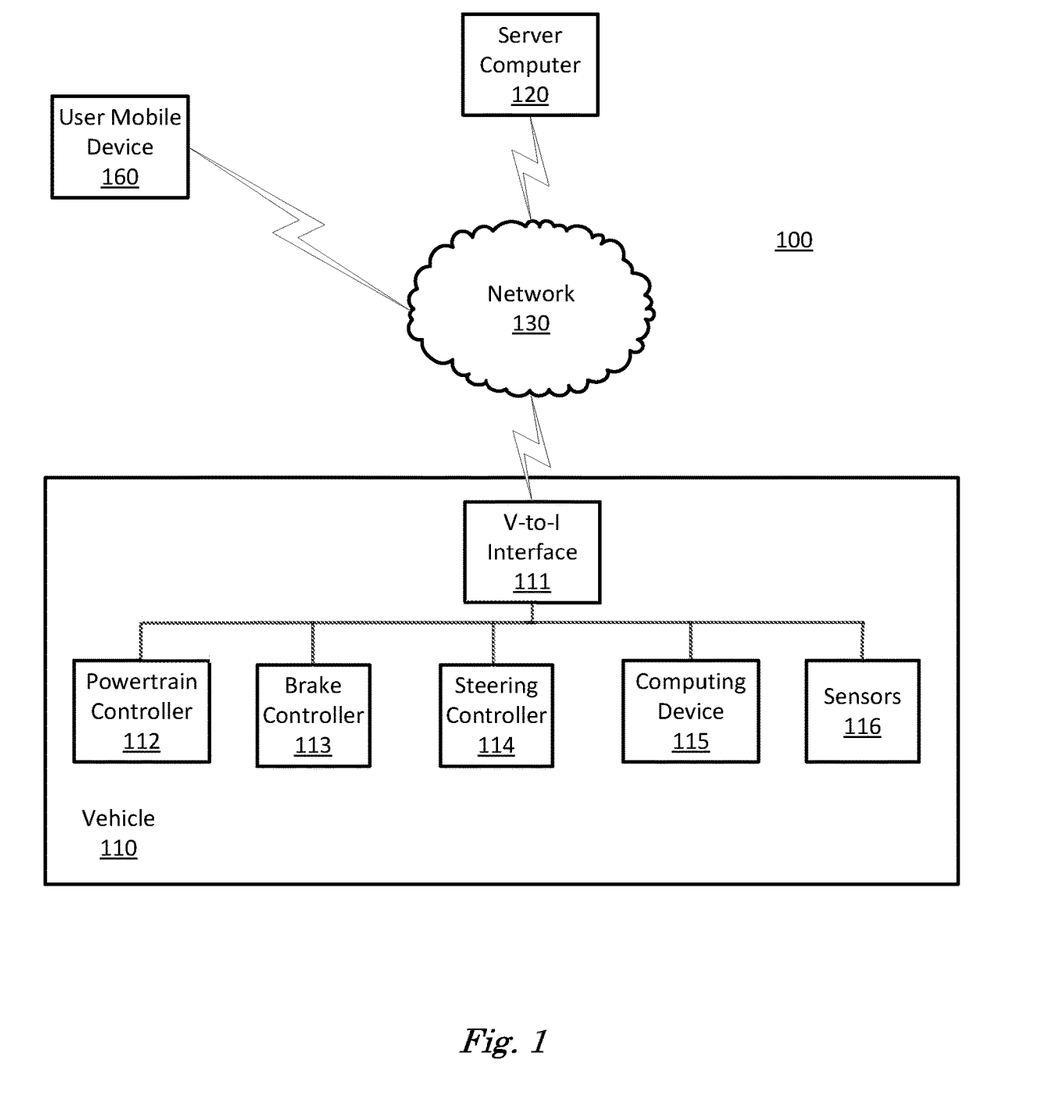
FIG. 1 is a block diagram of an example traffic infrastructure system.

FIG. 1 is a diagram of a traffic infrastructure system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
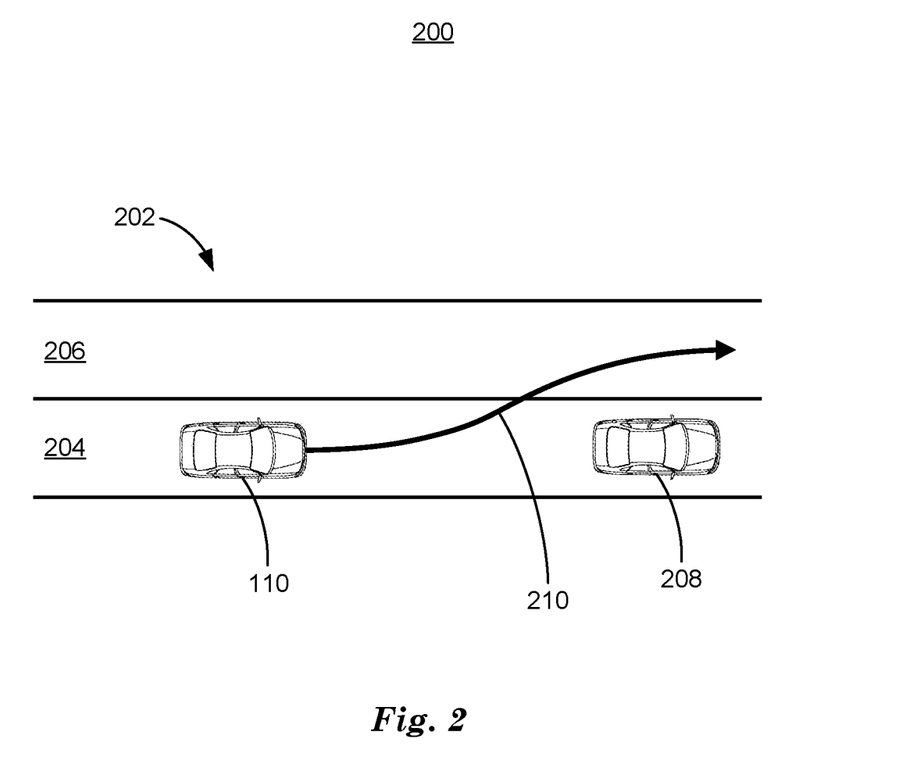
FIG. 2 is a diagram of an example vehicle scene.

FIG. 2 is a diagram of an example traffic scene 200 including a vehicle 110 operating on a roadway 202 in a lane 204. Vehicle 110 operation can be represented by a path polynomial 210. A vehicle vector is a collection of data values that describe the location, position and motion of a vehicle including a vehicle trajectory, where the vehicle trajectory includes vehicle 3D pose and vehicle 3D acceleration, where 3D pose includes x, y, and z position coordinates and roll, pitch and yaw rotational coordinates with respect to a coordinate system such as latitude, longitude and altitude, and 3D acceleration includes accelerations in x, y, z, linear directions and roll, pitch and yaw rotational directions A path polynomial is a polynomial function of degree three or less calculated on a vehicle vector that includes estimated or predicted vehicle trajectories. A path polynomial can estimate or predict vehicle trajectories, including vehicle location, speed and direction based on a current vehicle location and a destination location, for example. For computational purposes, 3D vehicle trajectory data can be expressed as 2D location in a plane parallel to a roadway, 2D direction in the plane, speed in the 2D direction and lateral and longitudinal accelerations with respect to the 2D direction of a vehicle 110. Computing device 115 in vehicle 110 can determine a path polynomial by estimating future trajectories for vehicle 110. The future trajectories can be estimated based on a determined destination location or goal location in traffic scene 200 and then determining a succession of locations that reach the destination location or goal at a target speed while limiting lateral (yaw) and longitudinal (x) accelerations due to steering, braking and powertrain to user input limits. Computing device 115 can then use the path polynomial to determine commands for controllers 112, 113, 114 to cause vehicle powertrain, steering and braking to operate based on applying the commands to a mathematical model of vehicle 110 that predicts vehicle 110 behavior and selecting commands that will result in vehicle 110 operating along the path polynomial.

Included in example traffic scene 200 is another vehicle 208 operating on roadway 202. In this example, vehicle 110 can be traveling at a greater speed than another vehicle 208. If vehicle 110 does not change its trajectory, including speed and direction, a collision or near-collision with another vehicle 208 can occur. In this example, vehicle 110 can slow down to substantially match the speed of another vehicle 208 or can perform a lane change maneuver (i.e., for passing), illustrated by path polynomial 210. Computing device 115 can be programmed to determine how to respond to this situation, either slowing to match traffic or passing another vehicle 208 based on vehicle 110 sensor 116 data, and to select a response depending upon a previously determined set of criteria based on user input and stored at computing device 115 memory. These criteria can be input to a rule-based finite state machine that can be used by computing device 115 to make decisions regarding traffic situations. For example, if vehicle 110 sensors 116 indicate that no traffic exists in adjacent lane 206, computing device 115 can maintain vehicle 110 speed by executing a lane change maneuver as illustrated by path polynomial 210. If vehicle 110 sensors 116 indicate that adjacent lane 206 is occupied by other vehicles, computing device 115 can command vehicle 110 to remain in lane 204 and slow down to maintain a minimum distance from another vehicle 208. Using techniques discussed herein, operation of vehicle 110 is improved by having computing device 115 synthesize and emit spoken language cues and receive and interpret spoken language responses and thereby determine which action to take regarding traffic situations, rather than relying on, at least entirely, previously determined criteria.

Figure 3:
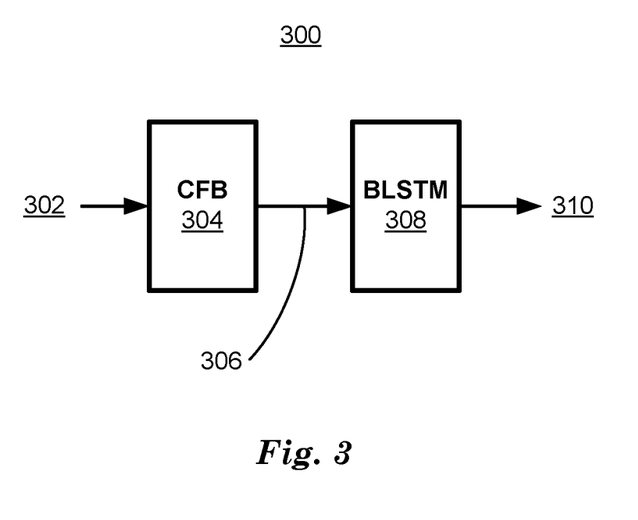
FIG. 3 is a diagram of an example neural network for processing spoken language.

FIG. 3 is a diagram of an example neural network (NN) 300. NN 300 can be used by computing device 115 to synthesize spoken language cues and interpret spoken language responses by processing mel-frequency data 302 which is spoken language audio spectrum data 310 transformed with a log power transform, where transform results are encoded on a nonlinear mel scale of frequency, wherein the mel scale is a log-based scale that approximates human hearing response. Synthetic spoken language cues can be stored and processed as mel-frequency data 302 because mel-frequency data 302 can represent audio data with a greater than 90% reduction in storage size compared to audio spectrum data 310. Synthetic spoke language cues can be stored at computing device 115 memory as mel-frequency data 302 and processed by NN 300 to produce audio spectrum data 310 that can be output by computing device with an appropriate audio system, for example audio amplifiers and speakers, to emit a spoken language cue that can be heard by an occupant in or nearby vehicle 110. Synthetic spoken language cues are spoken language cues generated by computing device 115 using computer-generated voice technology.

NN 330 includes a convolutional filter bank (CFB) 304 and a bidirectional long short-term memory (BLS™) 308. NN 308 can be based on a recurrent neural network for processing audio signals called a CBHG network available from GOOGLE™, Mountain View, Calif. NN 330 can input mel-frequency data 302 and output audio spectrum data 310 that corresponds to spoken language encoded in the mel-frequency data 302. Mel-frequency data 302 is a sequence of one-dimensional vector quantities, with a number of entries less than the number of entries in a corresponding audio spectrum sample. In this example the mel frequency data 302 can have about of 80 entries per one-dimensional vector. Mel frequency data 302 can be determined by computing device 115 converting text that represents spoken language into mel-frequency data 302. Text representing spoken language can be converted to mel-frequency data 302 based on previously determined rules that determine mel-frequency data 302 corresponding to a particular portion of text. These rules can be previously determined by matching text with audio spectrum data 310 that corresponds to the sound of the text being spoken aloud and then transforming the audio spectrum data 310 to determine the mel-frequency data 302 that corresponds to the audio spectrum data 310. The mel-frequency data 302 can be stored at computing device 115 memory indexed according to the corresponding text and recalled based on the text.

CFB 304 inputs mel-frequency data 302 and performs one-dimensional convolutions to model contextual information present in the mel-frequency data 302. The mel-frequency data 302 is filtered by CFB 304 to reinforce the temporal correlation between mel-frequency data 302 samples, for example. A phoneme is a basic unit of spoken language. Spoken language can be regarded as a stream of phonemes, where the pitch, volume and sound of each phoneme is influenced by the phonemes around it in the spoken language stream. Because mel-frequency data 302 is based on transformed phonemes, filtering mel-frequency data 302 in the temporal (x) direction can supply the mel-frequency data 302 with context to transform the mel-frequency data 302 into modified mel-frequency data 306 that includes local and contextual information explicitly modeled by CFB 304.

Modified mel-frequency data 306 is output to BLSTM 308 for conversion to audio spectrum data 310. BLSTM 308 is an example of a recurrent neural network, where computational nodes are connected together to form a directed graph and information travels in specified directions between computational nodes to permit BLSTM 308 to process temporal data. BLSTM 308 processes modified mel-frequency data 306, as temporal data wherein a location of the data in the data stream is indicative of a time sequence in which the data occurs, like modified mel-frequency data 306. Processing nodes of BLSTM 308 can store and recall previous results and apply them to current data. This permits BLSTM 308 to process temporal data like modified mel-frequency data 306 by combining data from a current modified mel-frequency data 306 vector with data from modified mel-frequency data 306 vectors that occur before and after the current modified mel-frequency data 306 vector.

Audio spectrum data 310 output from NN 300 is in the form of a power spectrum, where the audio spectrum data 310 is equal to the absolute value or square of an underlying audio waveform. Audio spectrum data 310 can be transformed into audio waveform by computing device 115 using a Griffin-Lim transform. A Griffin-Lim transform transforms power spectrum data like audio spectrum data 310 into audio waveforms that can be emitted by a vehicle audio system to reproduce spoken language using short term Fourier transforms to determine phase information for audio spectrum data 310 from input signals and thereby permit computing device 115 to transform audio spectrum data 310 into audio waveforms for output as a spoken language cue.

Figure 4:
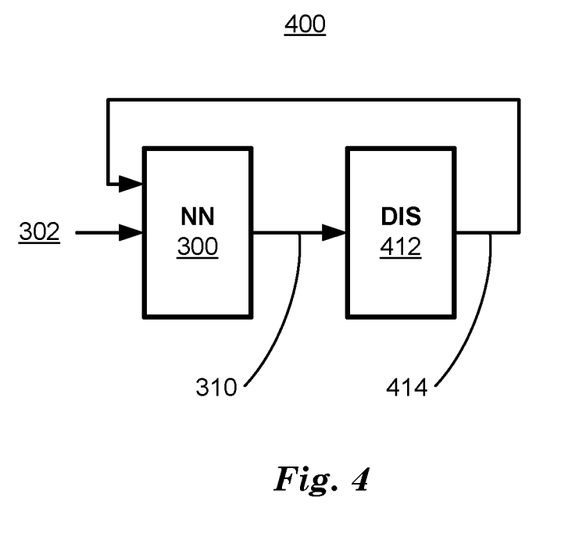
FIG. 4 is a diagram of an example neural network for processing spoken language.

FIG. 4 is a diagram of an example generalized adversarial network (GAN) 400. GAN 400 includes a generator NN 300 and a discriminator DIS 412. A GAN 400 is used to train NN 300 by determining a loss function 414 as feedback to be input to NN 300 along with the mel-frequency data 302 at training time. A GAN 400 classifies the output audio spectrum data 310 from NN 300 as either "true", meaning that the audio spectrum data 310 is spoken language, or "false", meaning that the audio spectrum data 310 is not spoken language. Audio spectrum data 310 output from NN 330 in response to mel-frequency data 302 input is input to DIS 412 to determine a one-bit (true/false) quantity that can be used as a loss function 414 for training NN 300. During training, loss function 414 is feedback to NN 300 to be combined with input 302 according to equation (2) below to positively or negatively reinforce the gain and bias parameters for computational nodes (neurons) of NN 300 that produce audio spectrum data 310, thereby training NN 300. In this example, NN 300 and GAN 412 are configured as the generator and discriminator of a generalized adversarial network, where the generator and discriminator are trained by the generator creating audio samples and the discriminator classifying the samples as real or fake by outputting a one-bit (true/false) quantity. The generator can create audio samples based on input mel-frequency data 302. The mel-frequency data 302 can be accompanied by ground truth that are audio samples that correspond to the mel-frequency data 302 determined by user input, e.g. a human listener can listen to the audio samples generated by the NN 300 generator and determine if they are "real" or "fake". The results of evaluating the audio samples by human user input are the ground truth corresponding to the mel-frequency data 302 and are input to the NN 300 at training time.

Loss function 414 can be combined with ground truth-based loss functions L1. Ground truth-based loss function L1 classifies audio spectrum data 300 as "true", meaning that a human listener hearing an audio waveform based on the audio spectrum data 300 would believe that it was spoken language, or "false" if a human listener would believe that it was not spoken language. Ground truth is data that has been acquired and processed using means that are independent from the means being trained, in this example NN 300. For example, ground truth-based loss functions can be determined by converting the audio spectrum data 300 to an audio waveform, amplifying the audio waveform and playing it through speakers to a plurality of human listeners and determining loss function L1 (true/false) based on statistical analysis of the opinions of the plurality of human listeners. Techniques disclosed herein improve training of NN 300 by providing loss function 414 in addition to loss function L1 which can provide loss function 414 in examples where audio spectrum data 310 was not included in the training set for loss function L, L2 making them absent, for example.

Figure 5:
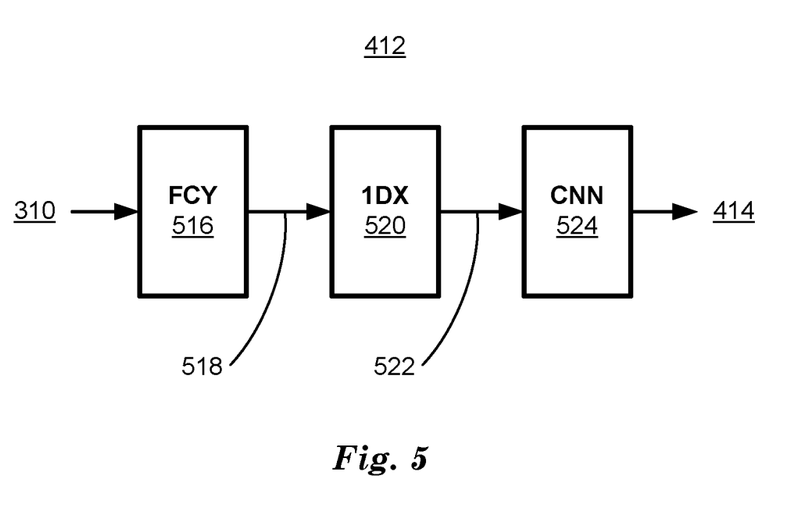
FIG. 5 is a diagram of an example neural network for processing spoken language.

FIG. 5 is a diagram of DIS 412, including fully connected neural network in the y-direction FCY 516, one-dimensional convolution in the x-direction 1DX, and convolutional neural network CNN 524. This architecture permits processing audio spectrum data 310 to produce loss function 414 by processing audio spectrum data 310 as translation invariant only in the time (x) direction. Convolutions are therefore only allowed in the x direction. The frequency direction (y) must be treated separately as one-dimensional channels. The number of filters is increased in the discriminator's convolutional layers in order to learn more features, at increased computational cost. In this example, because the number of energy-containing bins in the spectrogram is significantly smaller than the size of the spectrogram, the bin size can be collapsed in they direction by FCY 516 fully-connected layers. The vertical dimension of compressed audio spectrum 518 is reduced from the input audio spectrum data 310 but remains greater than one. Techniques described herein improve the calculation of loss function 414 by permitting the discriminator DIS 412 to have a sufficiently rich description of features while also reducing computational cost as compared with using the original, uncompressed spectrogram.

1DX 520 filters the compressed audio spectrum data 518 to form filtered audio spectrum data 522. Filtering the audio spectrum data 518 can remove signal noise and thereby improve the audio spectrum data 518. Filtered audio spectrum data 522 is passed to CNN 524, where the filtered audio spectrum is processed by convolutional layers and pooling layers of CNN 524 before being processed by fully connected layers of CNN 524 to determine a loss function:

$$L_{GAN} = E_{x \sim P_{real}} \log[\text{Dis}(x)] + E_{x \sim P_{fake}} \log[1-\text{Dis}(x)] \quad (1)$$

where the loss function $L_{GAN}$ is determined based on an expected log probability $E_{x \sim P_{real}}$ that the output of the CNN 524 Dis(x) is real or an expected log probability $E_{x \sim P_{fake}}$ that the output of the CNN 524 Dis(x) is false. To train NN 300, 'i'th layer of CNN 524 is used to compare the difference between real and fake samples. The loss function $L_{NN}$ can be written as:

$$L_{NN} = L1(\text{Dis}_i(x_{real}), \text{Dis}_i(x_{fake})) + \theta L1(x_{real}, x_{fake}) \quad (2)$$

Where θ is a tuning parameter that allows a portion of the ground truth-based loss function L1 to be retained and is based on user input, $x_{real}$, $x_{fake}$ are real and fake samples determined by ground truth and $\text{Dis}_i$ is the output function of the i'th layer of CNN 524, where ground truth is determined by human user input as discussed above.

Figure 6:
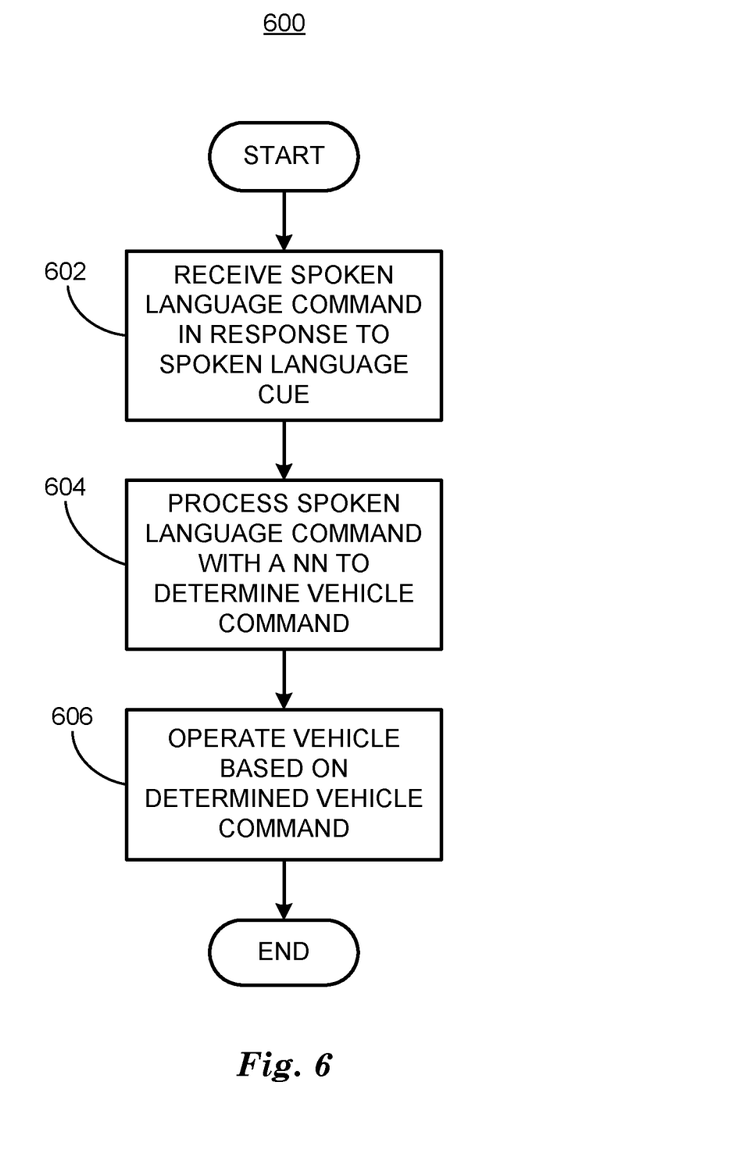
FIG. 6 is a flowchart diagram of an example process to operate a vehicle based on spoken language.

FIG. 6 is a diagram of a flowchart, described in relation to FIGS. 1-6, of a process 700 for operating a vehicle based on vehicle commands based on spoken language commands in response to a spoken language cue. Process 600 can be implemented by a processor of computing device 115, taking as input information from sensors 116, and executing commands and sending control signals via controllers 112, 113, 114, for example. Process 600 includes multiple blocks taken in the disclosed order. Process 600 also includes implementations including fewer blocks or can include the blocks taken in different orders.

Process 600 begins at block 602, where a computing device 115 in a vehicle 110 receives a spoken language command in response to a spoken language cue. Both the spoken language command and the spoken language cue can be processed by computing device 115 using a neural network (NN) 300. The NN 300 can be trained by including NN 300 in a generalized neural network (GAN) 400 as discussed in relation to FIGS. 3-5, above. A spoken language cue can be emitted by an audio system (amplifier and speakers) included in a vehicle 110. The response, received by computing device 115, can be a spoken command spoken by a human or a computing device. The spoken language cue can be a request for information or direction from computing device 115 and the spoken language command can be a response to the spoken language cue. For example, in traffic scene 200 of FIG. 2, computing device 115 in vehicle 110 can prompt an occupant of vehicle 110 with the spoken language cue "should we slow down or pass?" A response to the spoken language cue can be spoken language command "pass", for example, wherein computing device 115 can determine a vehicle command corresponding to a lane change maneuver based on the spoken language command input "pass".

At block 604 computing device 115 can use NN 300 to process a series of mel-frequency samples corresponding to commonly spoken commands. When a spoken language command is received computing device can transform the audio waveform to mel-frequency data 302 using non-linear Fourier transforms as discussed above in relation to FIG. 3. Using a GAN 400, computing device 115 can determine if the mel-frequency data 302 does not correspond to spoken language, and therefore should be not be processed further or if the mel-frequency data 302 corresponds to spoken language, and therefore should be processed to determine if the spoken language corresponds to a vehicle command. Mel-frequency data 302 can be processed with a deep neural network trained to identify vehicle commands in mel-frequency data 302 or processed with a rule-based finite state machine programmed to detect keywords or combinations of keywords in mel-frequency data 302, for example.

At block 606 computing device 115 processes the vehicle command determined at block 604 to operate vehicle 110 based on the vehicle command. Computing device can determine a path polynomial 210 as illustrated in FIG. 2 based on the vehicle command. In the traffic scene 200 in FIG. 2, vehicle command "perform land change maneuver" can be transformed into path polynomial 210 by selecting a destination location in lane 206 and determining lateral and longitudinal accelerations and vehicle speeds required to operate vehicle 110 on a path polynomial 210 that ends at a destination location with vehicle 110 maintaining a target speed and direction, while remaining within lower and upper acceleration limits, for example, i.e., computing device 115 can be programmed for what may be referred to as goal directed behavior. Computing device 115 can then emit commands to controllers 112, 113, 114 to control vehicle 110 powertrain, steering and braking to cause vehicle 110 to operate along path polynomial 210. Following block 608 process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
receiving a spoken language command in response to emitting a spoken language cue;
training a neural network (NN) at least in part by inputting mel-frequency data from the spoken language command combined with a loss function to a convolutional filter bank that outputs modified mel-frequency data to a bidirectional long short-term memory that in turn outputs audio spectrum data to determine a vehicle command using a generalized adversarial neural network (GAN) that determines a loss function by a combination of a binary classification of the output audio spectrum data as one of real or fake and a ground truth-based loss;
processing the spoken language command with the NN to determine the vehicle command; and
operating a vehicle based on the vehicle command.

2. The method of claim 1, further comprising transforming the spoken language command into mel frequency samples before processing with the NN.

3. The method of claim 2, wherein the mel frequency samples are each compressed into a single vector by convolving mel values along a y-axis before processing with the NN.

4. The method of claim 3, wherein a mel frequency scale is a log power spectrum of spoken language command frequencies on a nonlinear scale of frequencies.

5. The method of claim 1, further comprising training the GAN to determine real or fake spoken language using a plurality of recorded spoken language commands, ground truth that identifies the recorded spoken language commands as real or fake and a loss function based on ground truth.

6. The method of claim 1, wherein operating the vehicle includes determining a path polynomial based on the vehicle command.

7. The method of claim 1, wherein operating the vehicle includes determining a cognitive map based on vehicle sensor data.

8. The method of claim 1, further comprising processing synthetic language data with a GAN to determine the spoken language cue.

9. The method of claim 1, wherein the vehicle command is a request for goal-directed behavior of the vehicle.

10. A system, comprising a processor; and
a memory, programmed to:
receive a spoken language command in response to emitting a spoken language cue;
train a neural network (NN) at least in part by inputting mel-frequency data from the spoken language command combined with a loss function to a convolutional filter bank that outputs modified mel-frequency data to a bidirectional long short-term memory that in turn outputs audio spectrum data to determine a vehicle command using a generalized adversarial neural network (GAN) that determines a loss function by a combination of a binary classification of the output audio spectrum data as one of real or fake and a ground truth-based loss;
process the spoken language command with the NN to determine the vehicle command; and
operate a vehicle based on the vehicle command.

11. The system of claim 10, further comprising transforming the spoken language command into mel frequency samples before processing with the NN.

12. The system of claim 11, wherein the mel frequency samples are each compressed into a single vector by convolving mel values along a y-axis before processing with the NN.

13. The system of claim 12, wherein a mel frequency scale is a log power spectrum of spoken language command frequencies on a nonlinear scale of frequencies.

14. The system of claim 10, further comprising training the GAN to determine real or fake spoken language using a plurality of recorded spoken language commands, ground truth that identifies the recorded spoken language commands as real or fake and a loss function based on ground truth.

15. The system of claim 10, wherein operating the vehicle includes determining a path polynomial based on the vehicle command.

16. The system of claim 10, wherein operating the vehicle includes determining a cognitive map based on vehicle sensor data.

17. The system of claim 10, further comprising processing synthetic language data with a GAN to determine the spoken language cue.

18. The system of claim 10, wherein the vehicle command is a request for goal-directed behavior of the vehicle.

19. A system, comprising:
   means for controlling second vehicle steering, braking and powertrain;
   computer means for:
      receiving a spoken language command in response to emitting a spoken language cue;
      training a neural network (NN) at least in part by inputting mel-frequency data from the spoken language command combined with a loss function to a convolutional filter bank that outputs modified mel-frequency data to a bidirectional long short-term memory that in turn outputs audio spectrum data to determine a vehicle command using a generalized adversarial neural network (GAN) that determines a loss function by a combination of a binary classification of the output audio spectrum data as one of real or fake and a ground truth-based loss;
      processing the spoken language command with the NN to determine the vehicle command; and
      operating a vehicle based on the vehicle command and the means for controlling vehicle steering, braking and powertrain.

20. The system of claim 19, further comprising transforming the spoken language command into a mel frequency samples before processing with the NN.

* * * * *